Oct. 31, 1967  J. B. ALDEN  3,350,058
GATE VALVES
Filed Aug. 9 1965  2 Sheets-Sheet 1

JOHN B. ALDEN
INVENTOR

BY *[signature]*
ATTORNEY

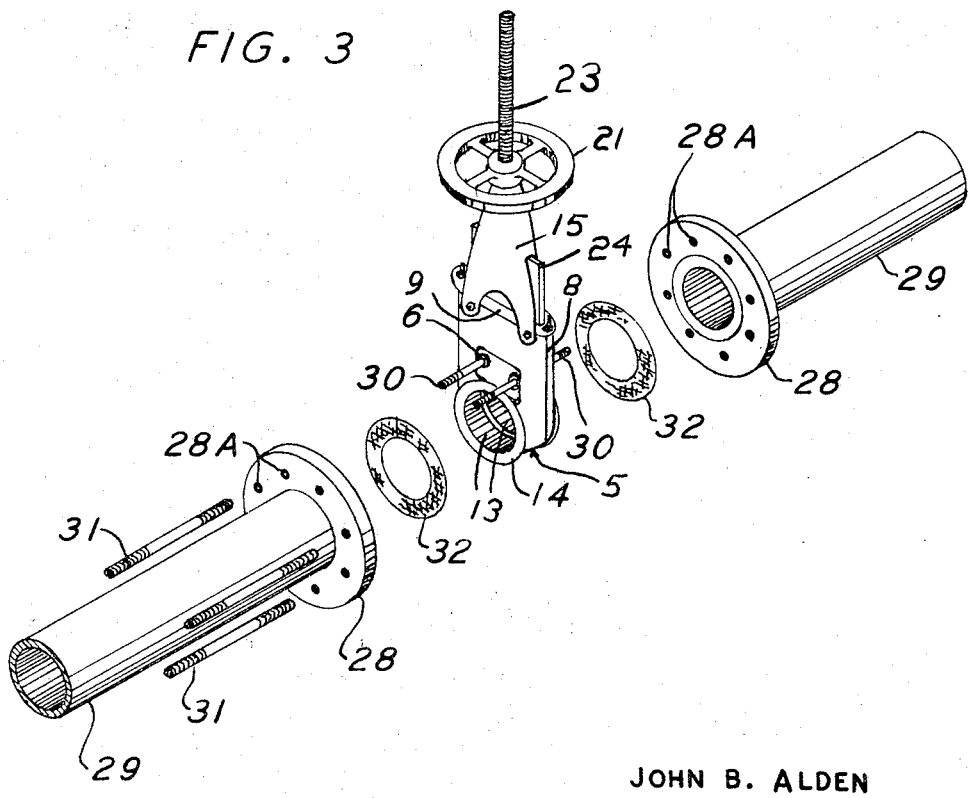

United States Patent Office 3,350,058
Patented Oct. 31, 1967

3,350,058
GATE VALVES
John B. Alden, 163 State St., Gorham, Maine 04038
Filed Aug. 9, 1965, Ser. No. 478,269
11 Claims. (Cl. 251—329)

ABSTRACT OF THE DISCLOSURE

A gate valve having a hollow housing formed with alined, spaced apart ports and containing a resilient plastic body preferably formed within the housing and having a passage for the blade, and a flanged sleeve in each port, the plastic body sealing the housing against leakage along the blade and the sleeves.

---

The present invention relates to gate valves and particularly to such valves of the wafer type and for use in handling fiber-containing liquids.

While gate valves in accordance with the invention are adapted to be used wherever any gate valve may be advantageously employed, fiber-containing liquids are troublesome due to the tendency of the fibers to collect and build up on exposed edges in a valve. In any installation, however, problems of initial expense and maintenance exist. In connection with the former, protection against corrosion is a factor in valve costs while maintenance is concerned both with the cost of a repair and the time required to effect it.

There is a real demand, accordingly, for gate valves of relatively low cost that are adapted to be quickly and inexpensively installed and serviced. In accordance with the invention, this demand is met by a valve including a housing and seal of low cost and conduit sections in the form of sleeves and a gate blade, together with its actuating mechanism, that are adapted to meet all requirements imposed by the handling of a particular liquid, the housing and seal being adapted to be an easily replaceable unit in the event leakage results and useable with sleeves and blades of different corrosion-resisting properties.

In accordance with the invention, a wafer type gate valve consists of a hollow housing having alined ports in its end walls for sleeves, each sleeve having a flange at one end with its other end extending into the housing. The flanges of the sleeves are seated against the housing end walls with their proximate ends spaced apart a predetermined distance. A gate blade in the housing is dimensioned to fit between the sleeves to block fluid flow from one sleeve to another and means connected to the gate blade and attached to the housing are operable to reciprocate the gate blade into and out of a position blocking fluid flow through the sleeves. The housing has portions extending inwardly relative to its end walls between which the gate blade extends and by which it is guided. Within the housing, there is a filler in the form of a unitary, resilient, plastic body sealing the housing against leakage lengthwise of the gate blade and axially between the housing and the sleeves.

Another objective of the invention is to have the sleeves press-fits in housing ports so that they may be quickly and easily attached thereto or removed therefrom.

Another objective of the invention is to have the housing formed by joining together two identical stampings to provide a shell within which the resilient plastic body may be formed.

In the accompanying drawings, there is shown an illustrative embodiment of the invention from which these and other of its objectives, novel features, and advantages will be understood.

In the drawings:

FIGURE 3 is an exploded, perspective view illustrating the mounting of the valve between flanged pipe ends.

Figure 1:
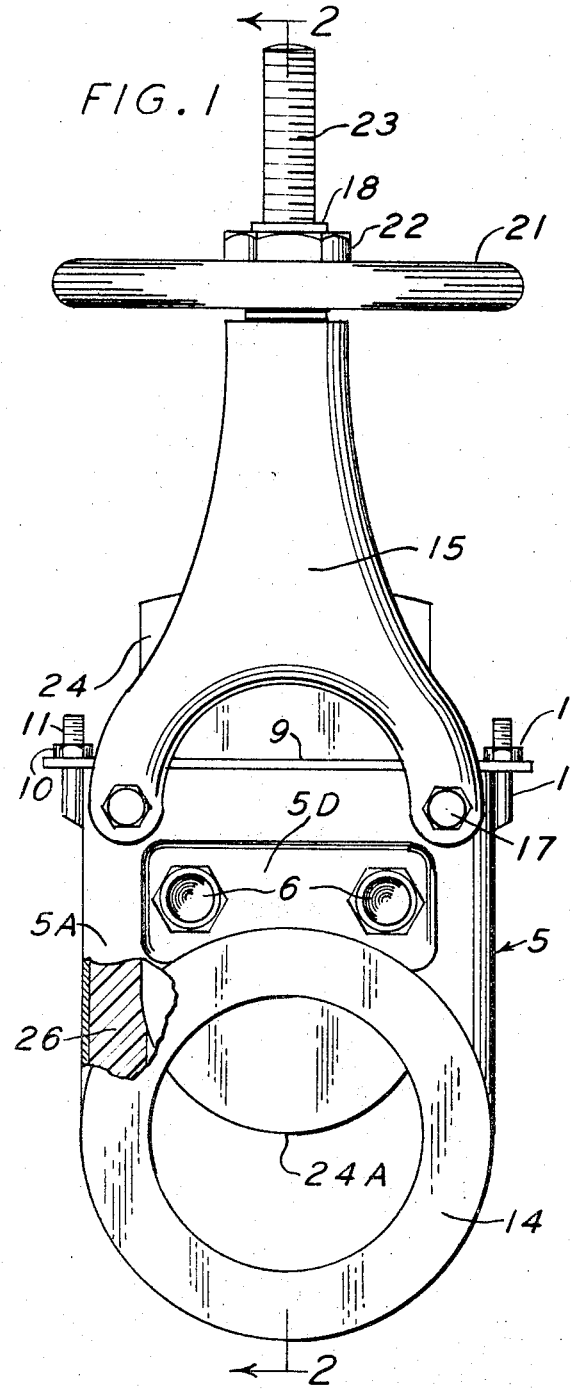
FIGURE 1 is a view of the valve as seen from one of its ends.
Figure 2:
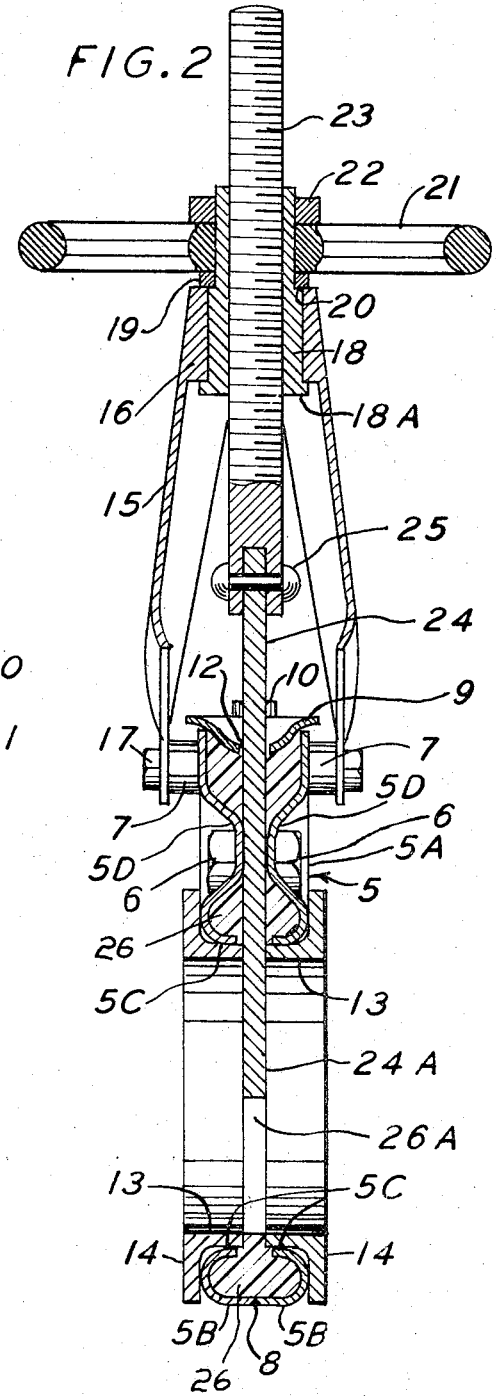
FIGURE 2 is a section taken approximately along the indicated lines 2—2 of FIGURE 1.

The valve shown in the drawings has a housing generally indicated at 5 consisting of two identical sections that may be stampings. Each section includes a wall 5A and an inturned flange 5B extending from its upper edge at one side around the bottom and back to the upper edge at the other side. Each wall 5A also has an inturned, circular flange 5C adjacent its bottom edge and, while the flange 5C is shorter than the flange 5B, it desirably has its port-defining end cylindrical. Between its circular flange 5C and its flange-free upper edge, each wall 5A has an inwardly disposed, flat-surfaced portion 5D providing a corresponding recess in its outer face in which two, laterally spaced, threaded sockets 6 are mounted, the sockets 6 being spaced equally from the center of the circular flange 5C. Similar sockets 7 are mounted on the walls 5A adjacent their unflanged edges.

The two sections are joined together as by welding their flanges 5B together, the weld seam being indicated at 8. The flanges 5B thus become the sides of the housing 5 with the flange free upper edges defining an opening closed by a cover 9 secured by nuts 10 threaded on bolts 11, one on each side of the housing 5, extending upwardly through the ends of the cover 9. The cover 9 has a lengthwise slot 12.

Two identical sleeves 13, each having an end flange 14, are press-fits in the ports defined by the circular flanges 5C and, when their end flanges 14 are seated against the walls 5A, their inner ends are spaced apart approximately the same distance that separates the proximate faces of the wall portions 5D.

The supports 15 of a hub 16 are attached to the housing 5 by means of screws 17 threaded into the sockets 7. A sleeve nut 18 is rotatable within the hub 16 and is held captive by reason of its flange 18A engaging the undersurface of the sleeve nut 18 and by reason of the washer 19 seated on its shoulder 20 when the hand wheel 21 is clamped against it by a nut 22 threaded on the upper end of the sleeve nut 18. A spindle 23, threaded through the sleeve nut 18 has a bifurcated lower end receiving the upper end of a gate blade 24 which is anchored thereto by a pin 25.

The gate blade 24, dimensioned to block the flow of liquid between the sleeves 13, extends into the housing 5 through the slot 12 in the cover 9 downwardly between the proximate faces of the portions 5D which are so spaced as to slidably guide the gate blade 24 as it is raised and lowered by turning the hand wheel 21 in one direction or the other to open or close the valve. The proximate ends of the sleeves 13 are spaced apart to receive the blade 24 between them.

The housing 5 contains a resilient body or filler 26 having a slot 27 for the gate blade 24 and is dimensioned to enable the body 26 to function as a seal against leakage along the blade 24. The body 26 also encircles the sleeves 13 and provides a seal against axial leakage between them and the circular flanges 5C. The body 26 is shown as fitting the lower half of the space between the sleeves 13 so as to lie flush with the corresponding edges thereof when the blade 24 has been raised to an appropriate extent. This portion of the body 26 is indicated at 26A and yields when the blade 24 is lowered, the lower end 24A of the gate blade being semicircular with its diameter slightly greater than that of the sleeves 13.

In practice, the body 26 is a plastic material that can be formed within the housing 5 into a body having the desired sealing characteristics. For this reason, polyurethanes are satisfactory as a housing 5 can serve as a mold with a blade, not shown, similar to the blade 24 but undersized, so that the slot 27 will be similarly undersized thereby ensuring the sealing of the blade 24 against leakage lengthwise thereof. When the body 26 is formed in the housing 5 before the sleeves 13 are inserted, as is preferred, similarly shaped plugs, not shown, are used to close the space between the dummy blade and the proximate ends of the circular flanges 5C. It will be noted that the portions 5D terminate short of the sides of the housing 5 to ensure that the body material seals the sides of and will fill the lower part thereof.

The valve shown in the drawings is adapted to be installed between the flanges 28 of pipe sections 29, the flanges 28 having a series of holes 28A with corresponding holes of the two flanges being in alinement. Bolts 30 extend through two of the holes in each flange 28 and into the sockets 6 proximate thereto. Because of the shape of the housing 5 relative to the flanges 28, the flanges 28 may be directly connected together through the other flange holes as by bolts 31 to clamp gaskets 32 tightly against the sleeve flanges 14.

Should leakage develop, the valve may be easily removed from the line, the sleeves 13 withdrawn and inserted into another housing 5, the screws 17 removed so that the blade and its actuating mechanism can be incorporated in such other housing to establish an appropriately sealed substitute valve that can be quickly and easily connected to the flanges 28 to enable service to be re-established in a minimum length of time.

I claim:

1. In a gate valve of the wafer type, a hollow housing having alined, spaced apart ports in its end walls, a rigid sleeve for each port, each sleeve including a flange at one end with its other end extending into the housing through an appropriate one of said ports, the flanges of the sleeves being seated against the outer surface of said walls and the proximate ends of said sleeves being spaced apart a predetermined distance, a gate blade within said housing and dimensioned to enter the space between said ports and to fit between said sleeves to block fluid flow from one to the other thereof, means connected to said blade and attached to said housing and operable to reciprocate said blade into and out of a position blocking fluid flow through said sleeves, said housing including portions extending inwardly from said walls between which said blade extends and by which it is slidably supported and guided, and a unitary resilient plastic body in said housing sealing said housing against leakage lengthwise of said blade and axially between said housing and said sleeves.

2. The gate valve of claim 1 in which the body plastic is a polyurethane and the body is the mold.

3. In a gate valve of the wafer type, two sections, each including a wall having a port and marginal portion joined to provide a hollow housing with said ports alined and spaced apart and with an opening transverse with respect to the axis thereof, a rigid sleeve for each port, each sleeve including a flange at one end with its other end extending into the housing through an appropriate one of said ports, the flanges of the sleeves being seated against the outer surface of said walls and the proximate ends of said sleeves being spaced apart a predetermined distance, a gate blade within said housing dimensioned to enter between said ports and to fit between said sleeves to block fluid flow from one to the other thereof and extending through said opening, means connected to said blade and attached to said housing and operable to reciprocate said blade into and out of a position blocking fluid flow through said sleeves, said walls including inwardly disposed portions between which said blade extends and by which it is slidably supported and guided, and a unitary resilient plastic body in said housing sealing said housing against leakage lengthwise of said blade and axially between said housing and said sleeves.

4. The gate valve of claim 3 in which the sections are identical stampings.

5. The gate valve of claim 3 in which the sections are identical stampings and the sleeves are detachable therefrom.

6. The gate valve of claim 3 in which the housing sections are identical stampings, the marginal portions thereof are disposed angularly relative to the walls, and there is a circular inturned flange defining each port and extending in the direction of but shorter than the marginal portions, and the sleeves are press-fits in the circular flanges.

7. The gate valve of claim 3 in which the housing sections are identical stampings, the marginal portions thereof are disposed angularly relative to the walls and there is a circular flange defining each port and extending in the direction of but shorter than the marginal portions and being cylindrical at its free end, and the sleeves are press-fits in the circular flanges.

8. In a gate valve of the wafer type, a hollow housing having alined spaced apart ports in its end walls and an opening transverse with respect to the axis defined by the ports, a rigid sleeve for each port, each sleeve including a flange at one end with its other end extending into the housing through an appropriate one of said ports, the flanges of the sleeves being seated against the outer surface of said walls and the proximate ends of said sleeves being spaced apart a predetermined distance, a gate blade within said housing and extending through said opening and dimensioned to enter between said ports and to fit between said sleeves to block fluid flow from one to the other thereof, means connected to said blade and attached to said housing and operable to reciprocate said blade into and out of a position blocking fluid flow through said sleeves, each end wall including an inwardly disposed flat-surfaced portion between said ports and said opening and spaced from the sides of said housing and of a width approximately equal to that of the blade, said blade being between and slidably guided by said flat-surfaced portions, and a unitary resilient plastic body in said housing sealing said housing against leakage lengthwise of said blade and axially between said housing and said sleeves.

9. The gate valve of claim 8 in which each end wall has a pair of outwardly open, laterally spaced, threaded sockets secured to the outer face of its flat surfaced portion, the sockets being spaced equally from the axis of the ports.

10. The gate valve of claim 8 in which the housing consists of two identical stampings, each stamping including a wall portion which is a housing end wall and a marginal flange disposed angularly with respect thereto and extending from one end of the housing opening to the other end thereof.

11. In a gate valve of the wafer type, a hollow housing having alined spaced apart ports in its end walls and an opening transverse with respect to the axis defined by the ports, a rigid sleeve for each port, each sleeve including a flange at one end with its other end extending into the housing through an appropriate one of said ports, the flanges of the sleeves being seated against the outer surface of said walls and the proximate ends of said sleeves being spaced apart a predetermined distance, a gate blade within said housing and extending through said opening and dimensioned to enter the space between said parts and to fit between said sleeves to block fluid flow from one to the other thereof, means connected to said blade and attached to said housing and operable to reciprocate said blade into and out of a position blocking fluid flow through said sleeves, said housing including portions extending inwardly from said walls between which said blade extends and by which it is supported and slidably guided, a unitary resilient plastic body in said housing sealing said housing against leakage lengthwise of said blade and axially between said housing and said sleeves, and a cover secured to said opening and having a slot through which said blade extends, said cover including downwardly and inwardly tapering portions compressing the plastic body adjacent said housing opening.

References Cited

UNITED STATES PATENTS

| 2,893,684 | 7/1959 | William et al. | 251—329 X |
| 2,934,313 | 4/1960 | Allen | 251—329 X |
| 2,942,841 | 6/1960 | Stillwagon | 251—326 X |
| 3,198,484 | 8/1965 | Martindale | 251—329 |

M. CARY NELSON, *Primary Examiner.*

A. ROSENTHAL, *Assistant Examiner.*